J. Scouler,
Camera Stand,
Nº 46,396. Patented Feb. 14, 1865.

Witnesses:
C. L. Topliff
Henry Morris

Inventor:
James Scouler
by Munn & Co.
Attys

UNITED STATES PATENT OFFICE.

JAMES SCOULER, OF SAN FRANCISCO, CALIFORNIA.

PHOTOGRAPHIC-CAMERA STAND.

Specification forming part of Letters Patent No. 46,396, dated February 14, 1865.

*To all whom it may concern:*

Be it known that I, JAMES SCOULER, of San Francisco, in the county of San Francisco and State of California, have invented a new and Improved Camera-Stand; and I do hereby declare that the following is a full, clear, and exact description thereof, which will enable others skilled in the art to make and use the same, reference being had to the accompanying drawings, forming part of this specification, in which—

Figure 2:
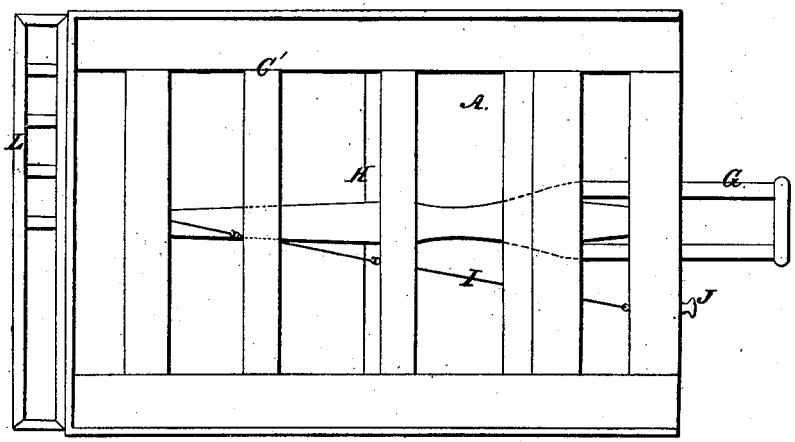
Figure 4:
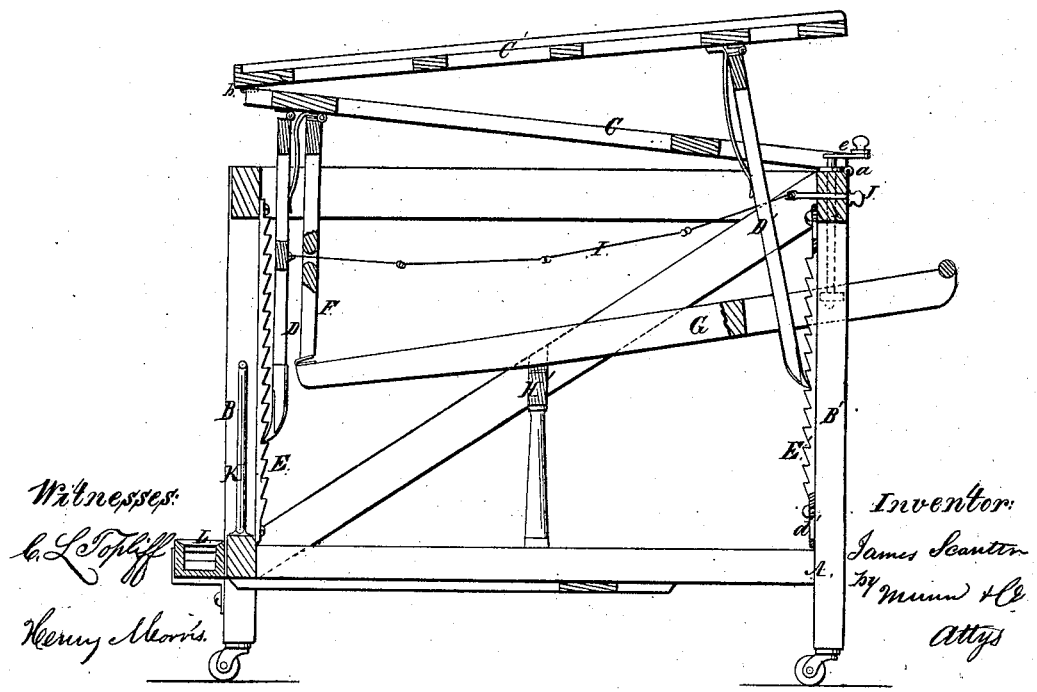

Figure 1 represents a longitudinal vertical section of this invention; Fig. 2, a plan or top view of the same.

Similar letters of reference indicate like parts.

This invention consists in the arrangement of two skeleton platforms, the lowest one of which is connected at one end to the main frame of the stand and at its opposite end to the upper platform by means of hinge-joints, to operate in combination with hinged spring-pawls and serrated bars at the opposite ends of the main frame in such a manner that the upper platform can be readily raised to any desired height and adjusted at any desired inclination. The loose end of the lower skeleton platform is connected by a hinged prop with a hand-lever extending back to the rear end of the stand to enable the operator to raise the loose end of said platform without leaving his place, and the pawls which support the loose end of the lower platform are connected by a chain or cord to a spring-button at the rear end of the stand to enable the operator to release said parts without walking to the front end of the stand. The serrated bar which supports the pawl extending from the loose end of the upper platform is adjustable by means of a set-screw for the final adjustment of the camera.

A represents the main frame of my camera-stand, which is made of wood or any other suitable material and supported by three legs, B B'—two in front and one in the rear. I use three legs by preference to prevent the stand from shaking when placed on an uneven floor. The frame A itself is square or oblong, and connected to its rear cross-bar by means of hinges *a* is the skeleton platform C, as shown clearly in Fig. 1 of the drawings. This platform covers the frame A or extends from the rear to the front end of the same, and connected to its loose end by hinges *b* is the second or upper skeleton platform, C'. This platform is intended to support the camera, and to prevent the same sliding off accidentally it is provided with a low projecting rim on three sides.

The loose end of the platform C can be raised or lowered by means of a double spring-pawl, D, the points of which engage with the teeth of serrated bars E, secured to the inner sides of the legs B, and in order to enable the operator to raise and lower said loose end without walking round the stand, a prop, F, is hinged to said platform close to its loose end, and this prop extends to one end of a hand-lever, G, which has its fulcrum on the central cross-bar, H', of the frame A, and the other end of which extends back to such a position that the operator can conveniently reach it without leaving his place.

The rear or loose end of the upper platform, C', is supported by a single pawl, D', the point of which catches in a serrated bar, E', secured to the inner side of the leg B'.

If the operator wishes to raise the upper platform at both ends, he first takes hold with his hands of the loose end of said platform and raises the same to the desired height, and then, by depressing the hand-lever G he raises the loose end of the lower platform and with it the front end of the upper platform until the same assumes the desired position, or with small stands the hand-lever can be depressed simultaneously with raising the loose end of the upper platform, the spring-pawls being so arranged that they catch automatically in the teeth of their serrated bars and require no further attention of the operator.

In order to lower the platform C', the pawls D D' have to be pressed back until their points release the teeth of the serrated bars, and to enable the operator to release the double pawl D without leaving his place a chain, I, extends from said pawl to a button, J, which is in convenient reach of the operator. By pulling this button the points of the double pawl are withdrawn from the serrated bars E, and the loose end of the lower platform can be lowered gently by the action of the hand-lever G. The loose end of the upper platform is lowered by taking hold of it with one hand and forcing the pawl D' out of contact with the teeth of the serrated bar E'.

In practice it is desirable to make the serrated bars E E' coarse enough to give to the points of the pawls a firm hold, and for this reason it may happen that the platform C' cannot be brought precisely in the desired position by raising or lowering the pawls one tooth. In order to effect the final adjustment with perfect accuracy, I have attached the serrated bar E', so that it slides up and down in slots d', and a hand-screw, e, serves to raise or lower it to the desired position.

The trough L, in front of the stand near its bottom, is for the purpose of receiving a plate-holder to drain while the operator is focusing the instrument. By this attachment the carpet is saved from the injurious effect of the liquid dripping from the plate, and, furthermore, the silver contained in said drippings is not lost.

While the plate-holder is in the trough dripping it is sustained by the brace K, fastened in the frame for this purpose.

This stand can be made in various sizes to suit convenience, and it sustains the camera with perfect steadiness at any desired point.

I claim as new and desire to secure by Letters Patent—

1. The skeleton platforms C C', connected to each other by a hinge-joint, b, and to the frame A by a hinge, a, to operate in combination with the spring-pawls D D' and serrated bars E E', in the manner and for the purpose, substantially as described.

2. The hand-levers G and button J, in combination with the platform C and pawl D, constructed and operating substantially as and for the purpose set forth.

3. The adjustable serrated bar D', in combination with the platforms C C' and set-screw d, constructed and operating as and for the purpose set forth.

JAMES SCOULER.

Witnesses:
J. TH. HELMSEN,
D. H. Y. MOSS,
H. J. WELLS.